United States Patent [19]

Hestehave et al.

[11] Patent Number: 4,759,708
[45] Date of Patent: Jul. 26, 1988

[54] APPARATUS FOR EXTRUSION BLOW MOLDING OF COMPARTMENTED CONTAINERS USING DUAL COOLED BLOW PINS

[75] Inventors: Borge Hestehave, Alta Loma; Kjeld Hestehave, Upland, both of Calif.

[73] Assignee: Bomatic, Inc., Ontario, Calif.

[21] Appl. No.: 31,610

[22] Filed: Mar. 30, 1987

[51] Int. Cl.⁴ .................... B29C 49/04; B29C 49/64
[52] U.S. Cl. .................................. 425/526; 425/536; 425/538
[58] Field of Search ............... 425/526, 535, 536, 538

[56] References Cited

U.S. PATENT DOCUMENTS

| | | | |
|---|---|---|---|
| 2,861,295 | 11/1958 | Hagen et al. | 425/532 |
| 3,048,889 | 8/1962 | Fischer et al. | 425/532 |
| 3,075,239 | 1/1963 | Strong | 425/142 |
| 3,116,877 | 1/1964 | Moslo | 425/533 |
| 3,369,273 | 2/1968 | Moran | 425/532 |
| 3,690,802 | 9/1972 | Fischer | 425/326 |
| 3,724,987 | 4/1973 | Schleemann | 425/436 |
| 3,940,225 | 2/1976 | Uhlig | 425/532 |
| 3,998,577 | 12/1976 | Farrell | 425/535 |
| 4,244,917 | 1/1981 | Ryder | 425/526 |
| 4,285,657 | 8/1981 | Ryder | 425/525 |
| 4,363,619 | 12/1982 | Farrell | 425/525 |
| 4,473,515 | 9/1984 | Ryder | 264/28 |

FOREIGN PATENT DOCUMENTS 2318315  11/1974  Fed. Rep. of Germany ...... 425/532

OTHER PUBLICATIONS

Anon Battenfeld Fischer FHB Blow Molding Machines, Fischer Kunstofftechnik.

Primary Examiner—Willard Hoag
Attorney, Agent, or Firm—Sixbey, Friedman & Leedom

[57] ABSTRACT

An extrusion blow molding apparatus of the type having a parison tube extruder and at least one blowing station for producing a dual-compartment container as an improvement for increasing the rate at which containers can be produced, wherein a cooling liquid is circulated through a pair of blow pins in a manner creating a zone of highest cooling effect at a tip portion of the blow pins for internally cooling a portion of the parison formed into pouring openings of the dual-compartment container. The zone of highest cooling effect is produced, in accordance with a preferred embodiment, through the provision of a blow pin assembly having an inner tube through which inflation air is blown into a parison, an outer sleeve positioned around the inner tube, and a tip element mounted in a position overlying an air outlet end of the inner tube. A blow port in the tip element communicates with an air outlet of the inner tube. A cooling chamber, forming the zone of highest cooling effect, is created within the tip element and communicates with an outlet of an inflow portion of a cooling fluid circulation path defined between the inner tube and outer sleeve, as well as with an inlet of an outflow portion of the cooling fluid circulation path. Moreover, the thickness of the flow path in areas peripherally surrounding the cooling chamber is reduced relative to the thickness of the blow pin in areas peripherally surrounding the inflow and outflow portions.

20 Claims, 4 Drawing Sheets

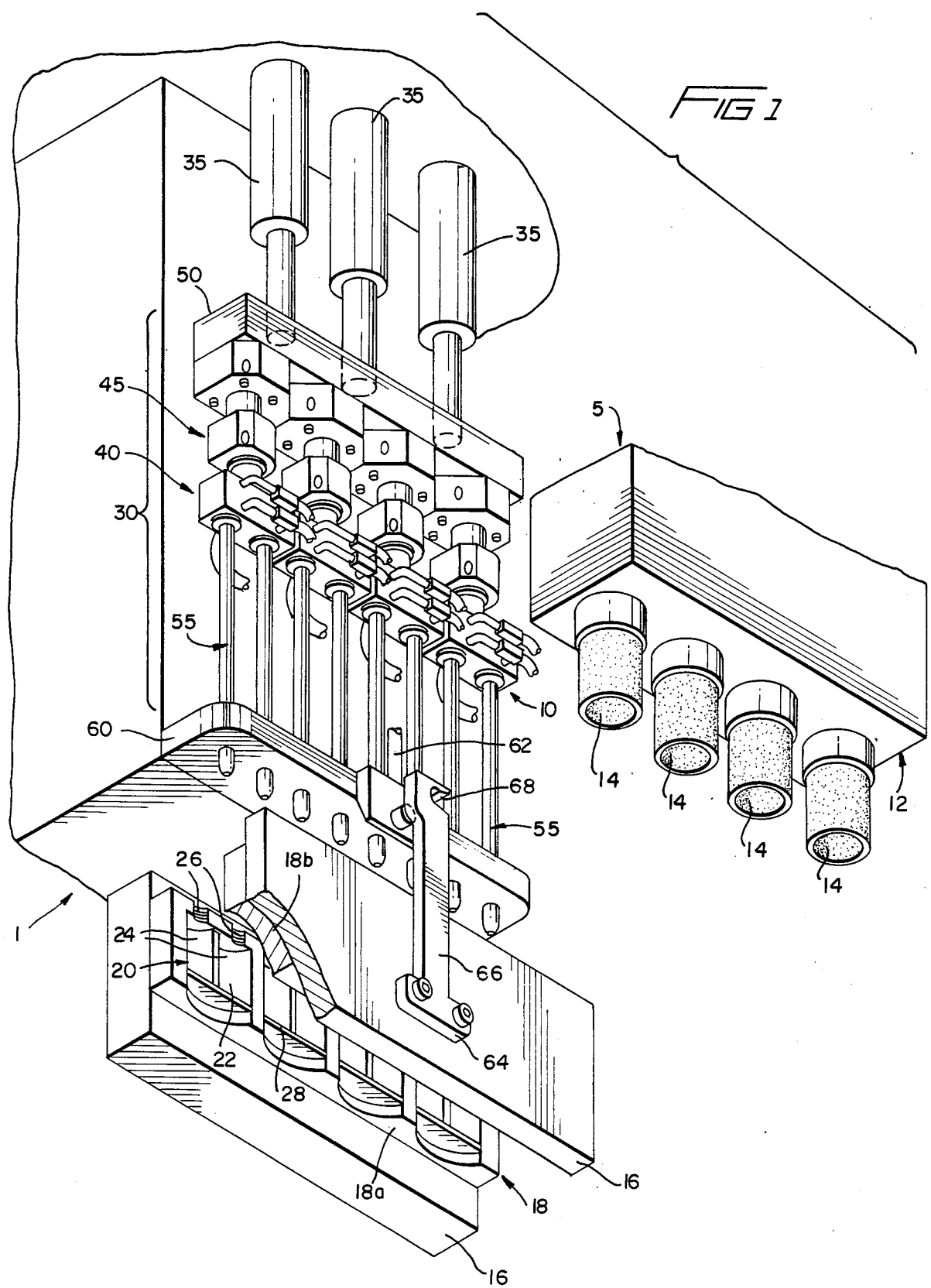

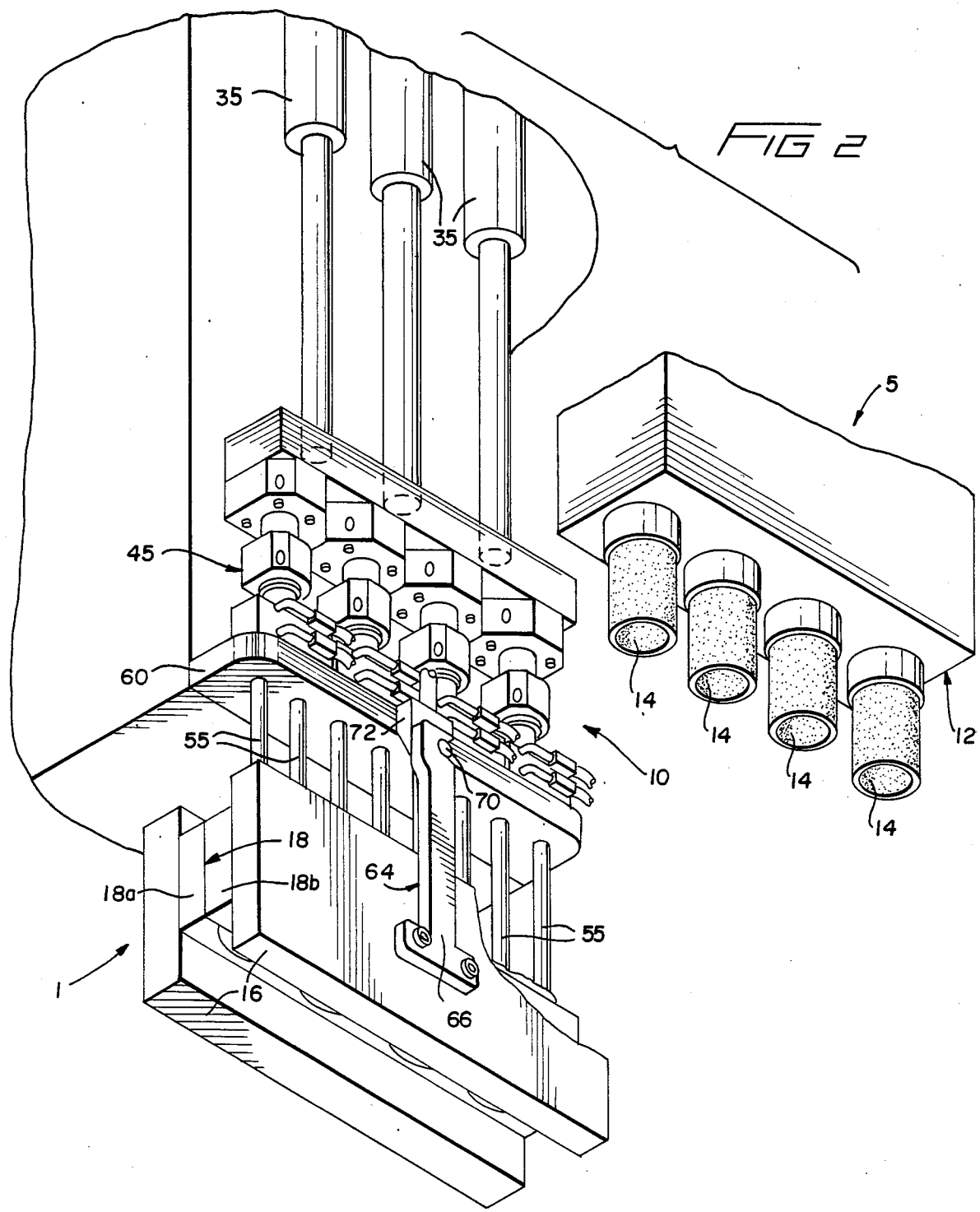

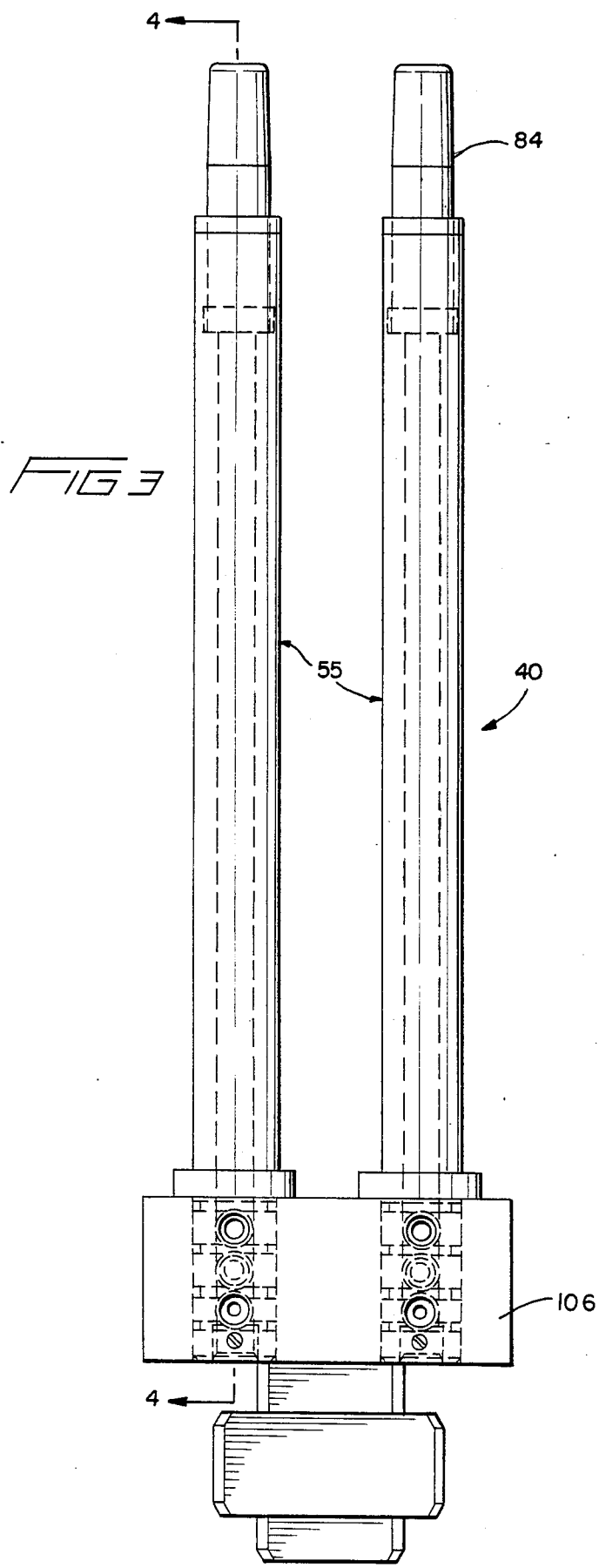
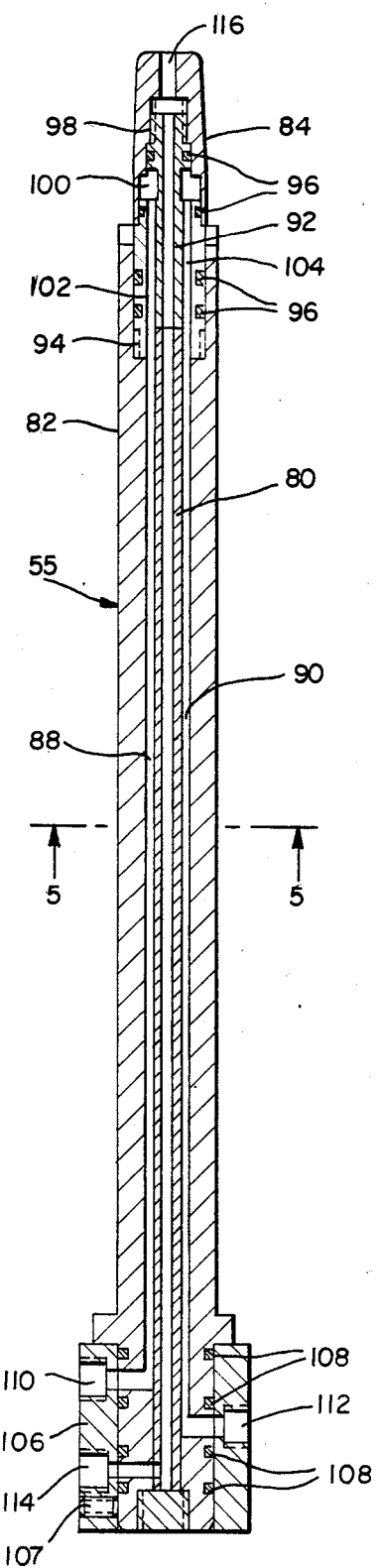

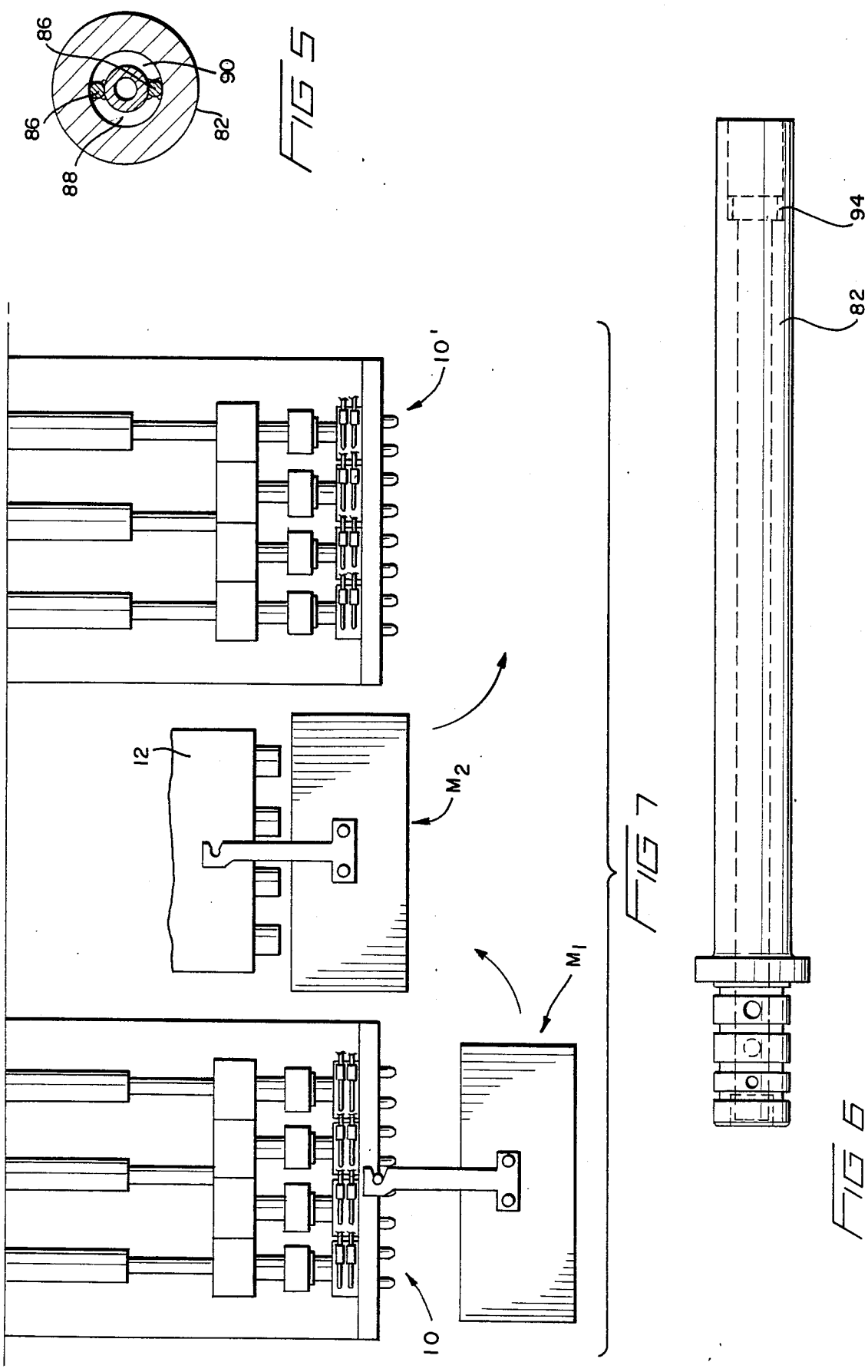

APPARATUS FOR EXTRUSION BLOW MOLDING OF COMPARTMENTED CONTAINERS USING DUAL COOLED BLOW PINS

BACKGROUND OF THE INVENTION

1. FIELD OF INVENTION

The present invention relates to the manufacture of hollow articles from extruded tubes by blow molding. More particularly, the invention relates to the manufacture of containers having compartments that are partitioned off from each other and have separate pouring openings, yet are interconnected in back-to-back fashion and, especially, apparatus for production of such containers.

2. DESCRIPTION OF RELATED ART

Containers which combine two individual containers into a single dual-compartment container are known. Such two-compartment containers are convenient, for example, for the storage of two different fluids, such as gasoline and lubricating oil for the preparation of fuel mixtures for two-stroke engines. It is also known to be able to produce such dual-compartment containers, wherein the compartments are separated and each compartment has its own pouring opening, by a process known as extrusion blow molding.

An example of an apparatus for the blowing of a two-compartment container can be found in U.S. Pat. No. 3,724,987. In accordance with this patent, an extruder extrudes a single tube of hot thermoplastic material in a vertical direction and two blow mold halves clamp onto the extruded tube. In each blow mold half, a mold cavity is formed that has a separating wall which is designed to vertically pinch the extruded tube so as to form a partition between the two compartments. A respective blow pin is displaced in a parting plane of the mold so as to enter into the tube at each of opposite sides of the pinched partition. Air at approximately 10 atmospheres pressure is directed by blow pin into each compartment for expanding of the tube into engagement with the walls of the mold cavity to form the container. Cooling of the blown container is achieved by the circulation of cold water through the mold walls, including separating wall. The blow pins, which are mounted on separate carriers for carrying out similar, but opposite, compound movements, also serve in conjunction with a threaded mold wall surface for forming a threaded spout-type pour opening on the container for each compartment.

However, such apparatus has deficiencies in several respects. Firstly, because the blow pins are separately mounted and must carry out composite movements in opposite directions, the cost and complexity of such an apparatus is greatly increased (making it, in a number of cases, infeasible to use with existing extrusion blow molding equipment). Also, it is virtually impossible to utilize multicavity molds, thereby precluding the possibility of simultaneously producing a plurality of containers at a single blowing station, thereby imposing drastic limitations on production capacity. Furthermore, even though the blowing operation for a given size container is shorter for a compartmented container than an uncompartmented one, because the thickest portion of the container remains to be the spout area which is not thinned due to the stretching occurring during inflation of the parison (and is actually thickened in the case of a threaded neck-type pouring opening), and because it is not subjected to the cooling effects of the air blown into the parison for inflation purposes, in order to avoid distortion of the pouring opening, the molds must remain closed for substantially the same length of time as would be the case for a single compartment container of comparable size to achieve sufficient cooling of the pouring opening.

Therefore, relative to such apparatus for producing dual compartment containers, the need exists for a means to increase production capacity, both in terms of the number of articles that can be produced at a single blowing station and in terms of the cycle time required before the mold can be opened for discharge of the blown container.

An extrusion blow molding apparatus is known from U.S. Pat. No. 3,075,239, wherein the mold is provided with a plurality of cavities whereby a like number of containers can be simultaneously blown via blow pins which are mounted to a common support bar for reciprocation toward and away from the mold. For cooling the neck of the container which defines the pour opening thereof, the blow pins are cooled, in the blowing position thereof, by having them extend through apertures formed in a stripper bar-carried, water-cooled tank. However, since there is no direct cooling of the tip portion of the blow pins and the water tank surrounds only an axially central portion of the blow pins, the tip portion, which requires the greatest cooling, is the least effectively cooled portion. Furthermore, such an indirect cooling technique is highly inefficient in that the heat must be conducted along the length of the blow pins to the area of the cooling tank. Additionally, because of the size of the water chamber of the cooling tank that must be disposed between the pins to produce a sufficient cooling effect, limitations are placed upon the minimum radial spacing between blow pins which, although adequate for the purpose of producing separate single compartment containers in a single mold, places undesirable limitations upon the placement of the pouring openings of the separate compartments of a dual compartment container. In some cases, this may prevent the pouring openings from being placed sufficiently close together to enable production of smaller size containers.

Therefore, relative to such a cooled blow pin arrangement, the need exists for a more effective means for cooling the tip of the blow pins and for a means to enable such cooling to be achieved without imposing undesirable limitations upon the minimum spacing at which one blow pin can be positioned relative to another.

In the injection blow molding of containers (as opposed to the extrusion blow molding thereof), parisons are formed in an injection mold about a core pin. The injection molded parison is then transferred on the core pins from the injection mold to a blow mold having a larger cavity. At the blow mold, the core pin serves as a blow pin and for insuring that the parison is at the proper temperature for blowing within the blow mold, it is conventional for a liquid heat transfer medium to be circulated through the length of the core/blow pin in order to heat and/or cool the parison, as appropriate. However, in such injection blow molding apparatus, the tip of the core/blow pin having the blowing air nozzle is positioned well within the cavity of the blow mold in the portion at which the bottom half of the container is to be formed. Also, the container neck forming the pouring opening is formed against an intermediate or base portion of the core, at the edge of the mold through which it is inserted. Additionally, the circulation of the liquid heat transfer medium through the core pin is designed to substantially uniformly maintain the temperature of the parison and no attempt is made to preferentially cool the portion at which the pouring opening is formed. On the other hand, the arrangements by which heat transfer mediums are delivered to and circulated through the core/blow pins imposes no undesirable spacing limitations and, in fact, it is commonplace for a plurality of such core/blow pins to be mounted upon a single support, and it is known for such a common support to function as a manifold for the delivery and return flow of the heat transfer medium and for supplying the blowing air. Examples of such injection blow molding apparatus can be found, for example, in U.S. Pat. Nos. 3,690,802; 3,998,577; 4,285,657; 4,363,619; and 4,473,515, to name a few.

Applicants have found that it would be desirable if the fluid heat transfer medium circulation techniques used in the injection blow molding art could be adapted to the needs that they have found to exist in the extrusion blow molding field, particularly in connection with the production of dual-compartment containers.

SUMMARY OF THE INVENTION

In view of the foregoing, it is an object of the present invention to provide an extrusion blow molding apparatus of the type having a parison tube extruder and at least one blowing station for producing a dual-compartment container, each compartment of which has a respective pouring opening, from a single parison in conjunction with a pair of blow pins, whereby the rate at which such containers are producible can be increased by increasing the number of mold cavities which can be simultaneously acted upon in a single blowing station and by providing a means by which the time that molds must remain in a closed condition before discharge of the blown container can be minimized.

In keeping with the foregoing object, it is a further object of the present invention to create a blow pin assembly that is constructed to provide a cooling chamber forming a zone of highest cooling effect within the tip of the blow pins.

It is yet another object of the present invention to provide a construction for the blow pin assembly which will enable the delivery of blowing air and the circulation of a cooling fluid through the blow pins without imposing undesirable limitations on the minimum mutual spacing required between the blow pins.

In order to achieve these and other objects, the extrusion blow molding apparatus and blow pin assembly in accordance with the present invention is constructed, in accordance with a preferred embodiment, of an inner tube through which inflation air is blown into a parison, an outer sleeve positioned around the inner tube and a tip element mounted in a position overlying an air outlet end of the inner tube, with inflow and outflow portions of a cooling fluid circulation path being defined between the inner tube and outer sleeve and with a cooling chamber being created within the tip that communicates with the inflow and outflow portions and forms a zone of highest cooling effect. This zone of highest cooling effect is achieved by virtue of the fact that the tip element has a reduced wall thickness in a portion thereof which defines a peripheral wall of the cooling chamber (which is disposed axially beyond a free end of the outer sleeve) that is thinner than outer wall portions of the blow pin that define the periphery of the inflow and outflow portions.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 1 is a schematic partial perspective view of an extrusion blow molding apparatus in accordance with the present invention showing the blowing station with the mold open and the blow pins retracted;

FIG. 2 is a view similar to FIG. 1, but with the blowing station shown with the mold closed and the pins extended into engagement therewith;

FIG. 3 is a front elevational view of a blow pin assembly in accordance with a preferred embodiment of the present invention;

FIG. 4 is a cross-sectional view taken along line 4—4 of FIG. 3;

FIG. 5 is a cross-sectional view through a single blow pin taken along line 5—5 of FIG. 4;

FIG. 6 is a front elevational view of an outer sleeve of the blow pin unit of FIG. 3; and FIG. 7 is a diagrammatic side view of the apparatus of FIGS. 1 and 2 for use in explaining a manner of operation whereby a pair of molds and two blowing stations may be services by a single extruder.

DETAILED DESCRIPTION OF THE PREFERRED EMBODIMENT

With reference to FIGS. 1 and 2, an extrusion blow molding apparatus in accordance with the present invention is designated generally by the reference numeral 1. The extrusion blow molding apparatus 1 has an extrusion station 5 and at least one blowing station 10. At extrusion station 5 an extruder 12 is located which has downwardly directed annular extrusion nozzles from which a plurality parison tubes 14 are extruded. A pair of platens 16, which may be reciprocated toward and away from each other by conventional means (not shown), carry a mold 18 that is comprised of a pair of mold halves 18a, 18b within which a number of mold cavities 20, equal in number to the number of parison tubes produced at extruder 12, are formed.

As can be seen most clearly in FIG. 1, each mold cavity 20 has a vertically extending, subdividing partition 22 which creates a pair of compartment forming cavity areas 24. Additionally, a container neck forming area 26 is associated with each of the compartment forming cavity areas 24. It is also noted that the subdividing partition 22 of each mold half is recessed below the parting plane of the mold halves 18a, 18b so that, in the closed position of FIG. 2, a separating wall will be formed in the blown container between the pair of compartments by a pinching together of diametrally opposite portions of the respective parison tube 14 as the mold halves are brought together at extrusion station 5. In this regard, it is also noted that a flash severing edge 28 is provided on, for example, mold half 18, which coacts with a complementary formation on the other mold half so as to sever a parison 14 from the remainder of each parison tube 14 suspended from the nozzles of the extruder 12.

It is noted that, to the extent described so far, the molding apparatus 1 merely represents known aspects of extrusion blow molding apparatus, and thus need not be described in greater detail. However, for the sake of completeness, it is noted that a specific example of a known extrusion blow molding machine that may be converted into an extrusion molding apparatus in accordance with the present invention by the addition of the features to be described hereafter is the Model 106 machine produced by Battenfeld Fisher.

At blowing station 10, a blow pin assembly 30, in accordance with the present invention, is provided. Blow pin assembly 30 is displaceable, as a whole, in a reciprocatory manner from the retracted position of FIG. 1 to the extended position of FIG. 2 by piston-cylinder units 35.

The blow pin assembly, itself, is comprised of a plurality of dual blow pin units equal in number to the number of mold cavities in the mold 18. Each of the dual blow pin units 40 is mounted via, for example, a respective height adjusting unit 45 to a support bar 50 which, together with the piston-cylinder units 35, comprise a common displacement means for displacing the pairs of blow pins of the dual blow pin units 40 in unison toward and away from the blow mold 18.

To ensure that each of the blow pins 55 properly seats within a respective container neck forming area 26 of the mold 18, movement of the blow pins 55 toward and away from the mold is guided and aligned via a bracing means 60 in the form of an apertured plate that has been joined at one edge to the side of the base of the apparatus, such as by welding, and which may be supported at its opposite edge, in a central area, via a supporting post 62 (only a bottom portion of which is illustrated in FIGS. 1 and 7 for purposes of clarity). To further stabilize the bracing means 60, a stabilizing arm means 64 may be bolted on to the outer of the two platens 16. Stabilizing arm 64 has an upwardly extending arm 66, at the uppermost end of which a notched engagement portion 68 is provided. Notched portion 68 of stabilizer arm 66 engages upon an engagement pin 70, in the closed position of the molds, and disengages therefrom in the open position. Engagement pin 70 projects outwardly from a mounting plate 72 that is secured to the bracing means 60. In this manner, in the closed position of the molds, the stabilizing arm means interconnects a platen 16 with the bracing means 60, thereby providing added stability during reciprocation of the blow pins 55 from their retracted position to their extended position within the container neck forming areas 26.

The height adjusting means 45 are used to set the height of the blow pins in their extended position to a point that is appropriate for the particular molds being used at the time. That is, at a height which will dispose the tip of each blow pin within a respective neck forming area 26. Once set, the height adjusting means would not be utilized again until a mold change is made. The height adjusting units 45 may utilize any known adjustment technique, such as telescopically interengaged members whose positions may be slidably adjusted and then secured via set screws, locking collars, or the like.

Having described the basic components of the extruder blow molding apparatus 1, a detailed description of an individual dual blow pin unit 40 will now be given with reference to FIGS. 3-6, wherein, it will be appreciated, the units 40 are illustrated in FIGS. 3, 4 and 6 in an inverted orientation relative to that shown in FIGS. 1, 2 and 5. Each blow pin 55 of the dual blow pin unit 40 is comprised of three major components: an inner tube 80, an outer sleeve 82, and a blow pin tip element 84. The outer sleeve 82 is positioned around the inner tube 80 with a clearance space therebetween, into which a pair of rods 86 (FIG. 5) is snugly inserted so as to extend along diametrally opposite sides of the clearance space, thereby subdividing it into two substantially semi-cylindrical spaces 88, 90. The space 88 serves as an inflow portion of a coolant circulation path through the blow pin 55 and the space 90 serves as an outflow portion of the coolant path. To insure that the rods 86 remain in their proper position, they may be tacked in place by suitable welds.

The inner tube 80 is also comprised of a seal element 92 which provides a sealed interconnection between the tip element 84 and the outer sleeve 82 via the threaded interconnections 94 and 98 at opposite ends thereof, and via the O-ring seals 96 disposed between seal element 92 and surrounding surface of the tip element and outer sleeve, respectively. It is noted that, from a manufacturing standpoint, it is simplest and most economical for the inner tube 80 to be formed from two separate pieces, i.e., a piece of cylindrical tubing and a machined seal element 92; although, the inner tube 80 could be comprised of a single unitary component which includes the seal element 92. Likewise, while it is simpler to utilize a separate outer sleeve 82, the inner tube 80 and outer sleeve 82 could be parts of a single unitary component.

As can be seen from FIG. 4, when the tip element 84 is attached in its position overlying the air outlet end of the seal element 92 of the inner tube 80, an annular cooling chamber 100 is formed which communicates with the coolant inflow portion 88 and the coolant outflow portion 90 via the coolant inlet 102 and coolant outlet 104 in the seal element 92. Furthermore, the portion of the tip element peripherally surrounding cooling chamber 100 has a thickness that is reduced as much as possible without unsatisfactorily reducing its strength, and this thickness is substantially less than the thickness of the blow pin in areas peripherally surrounding the inflow and outflow portions 88, 90, including the inlet and outlet 102, 104. In this manner, a zone of highest cooling effect is produced at the tip element 84 in the region of the cooling chamber 100.

In the position of the blow pin in the extended blowing position of FIG. 2, the cooling chamber is disposed within the container neck forming areas 26. By appropriate sizing of the tip element 84 relative to the neck forming areas 28, the blow tip element 84 will serve to compress the plastic material into the threading of the neck forming areas 26 and will size the internal diameter of the pouring openings. Furthermore, due to the relative thinness of the outer wall surrounding the cooling chamber 100 and the relative thickness of the blow pin walls surrounding the remaining portions of the coolant flow path, a concentrated cooling effect will be applied to the plastic material in the neck forming areas 26, thereby insuring a rapid cooling thereof so that the molds can be opened and the products discharged in a shorter time frame than usual, but without any fear of the pouring openings of the container becoming distorted.

The pair of blow pins 55 of each blow pin unit 40 is plugged into and secured to a common support 106. The means for securing the blow pins 55 to the support 106 may be bolts or any other conventional securement means, such as the set screw 107, which is shown merely for purposes of illustration. At the portion of the outer sleeve 82 that is received within the common support 106, seals 108 are disposed in grooves 109. Since the common support 106 serves as a manifold for connection of a cooling fluid supply via port 110, a cooling fluid return via port 112 and a blowing air supply via port 114, the O-rings 108 serve to provide a leak-free interconnection in the areas where these ports feed into the corresponding passages of the blow pins 55. Thus, the cooling liquid, such as water, is supplied via a hose connection to port 110 from which it flows up through the inflow portion 88 and inlet 102 into the cooling chamber 100, from which it is returned via the outlet 104, outflow portion 90, and port 112 to another hose connection. Similarly, air is blown into port 114 via a hose connection, travels from port 114 up the inner tube to its air outlet and then through and out the blow port 116 of the tip element 84.

With reference to FIG. 7, an apparatus is shown which, like the aforementioned Battenfeld Fisher Model 106, has a pair of blowing stations 10, 10', and a pair of mold units $M_1$, $M_2$. FIG. 7 shows the conditions of the molds just after discharge of a set of containers from the mold unit $M_1$ and prior to the mold unit $M_2$ receiving a new set of parison tubes. From this point in the apparatus cycle, mold unit $M_2$ would close upon a set of extruded parison tubes, severing parison portions therefrom. Thereafter, both mold units $M_1$ and $M_2$ would simultaneously swing in a counterclockwise direction from that illustrated, mold unit $M_2$ moving down and to the right into blowing station 10', and mold unit $M_1$ moving upward and to the left from blowing station 10 to extrusion station 5. After completion of the blowing and discharge of containers from mold unit $M_2$, a simultaneous counterclockwise swinging of both mold units would return them to the location shown in FIG. 7. Of course, the means for opening and closing the mold units $M_1$, $M_2$ and for displacing them in unison, are known and form no part of the present invention as such. Likewise, this form of multiple station blow molding apparatus is shown for purposes of illustration only, and it will be apparent to those of ordinary skill in the art that numerous other existing extrusion blow molding apparatus can be adapted into apparatus in accordance with the present invention through the utilization of Applicants' blow pin assembly in place of the blow pin assembly with which it is normally equipped.

Likewise, while we have shown and described only a single embodiment in accordance with the present invention, it should be understood that the same is not limited thereto, but is susceptible to numerous changes and modifications as will be known to those skilled in the art, and we therefore do not wish to be limited to the details shown and described herein, but intend to cover all such changes and modifications as are encompassed by the scope of the appended claims.

We claim:

1. In an extrusion blow molding apparatus of the type having a parison tube extruder and at least one blowing station for producing a dual-compartment container, each compartment having a respective pouring opening, from a single parison, in conjunction with a pair of blow pins and a single, subdivided mold cavity of a liquid cooled, multipart blow mold, the improvement for increasing the rate at which containers are produced in said blow mold comprising means for circulating a cooling liquid through said blow pins in a manner creating a localized zone of highest cooling effect at a tip portion of the blow pins for internally cooling a portion of said parison defining said pouring opening, and means for forming each said pouring opening by compressing a portion of the parison directly between said tip portion and a respective neck forming area of the mold.

2. In an extrusion blow mold apparatus according to claim 1, wherein said improvement further comprises said blow mold having a plurality of container-forming subdivided mold cavities and a said pair of blow pins operating in conjunction with each mold cavity.

3. In an extrusion blow molding apparatus according to claim 2, wherein each pair of blow pins is mounted to a common support for joint movement toward and away from the blow mold.

4. In an extrusion blow molding apparatus according to claim 3, wherein a common displacement means is provided for displacing the pairs of blow pins at the blowing station.

5. In an extrusion blow molding apparatus according to claim 1, wherein said pair of blow pins is mounted to a common support for joint movement toward and away from the blow mold.

6. In an extrusion blow molding apparatus according to claim 5, wherein said common support serves as a manifold for the delivery inflation air to each of the blow pins.

7. In an extrusion blow molding apparatus according to claim 6, wherein said common support also serves as a manifold for the delivery and return of cooling fluid circulated through said blow pins.

8. In an extrusion blow molding apparatus according to claim 7, wherein each blow pin is insertable, at a first end thereof, into a receiving bore of said common support and has an inner tube through which inflation air is blown into the parison via a blow port at a second end of the blow pin, and an outer sleeve positioned around said inner tube with inflow and outflow portions of a path for said cooling fluid through the blow pin being defined between the inner tube and outer sleeve.

9. In an extrusion blow molding apparatus according to claim 8, wherein a cylindrical clearance space is formed between said inner tube and said outer sleeve, a pair of rods being axial positioned and secured within the clearance space in a manner subdividing said clearance space into said inflow and outflow portions of said path.

10. In an extrusion blow molding apparatus according to claim 9, wherein said blow port is formed in a tip element that is mounted in a position overlying an outlet end of said inner tube in a manner creating a cooling chamber within said tip element that communicates with an outlet of said inflow portion and an inlet of said outflow portion of the cooling fluid path and that is sealed relative to the blow port and an air outlet of said inner tube.

11. In an extrusion blow molding apparatus according to claim , wherein said tip element has a reduced wall thickness in a portion thereof which defines a peripheral wall of said cooling chamber, said cooling chamber being disposed axially beyond a free end of the outer sleeve and said peripheral wall being substantially thinner than outer wall portions of said outer sleeve defining the periphery of said inflow and outflow portions to create said zone of highest cooling effect.

12. In an extrusion blow molding apparatus according to claim 1, wherein each blow pin is comprised of an inner tube through which inflation air is blown into the parison via an air outlet end thereof, an outer sleeve positioned around the inner tube with inflow and outflow portions of a cooling fluid circulation path being defined therebetween, and a tip element that is mounted in a position overlying an air oulet end of said inner tube in a manner creating a cooling chamber within said tip element that communicates with said inflow an outflow portions, wherein the thickness of said tip element in areas peripherally surrounding said cooling chamber is substantially reduced relative to the thickness of the blow pin in areas peripherally surrounding said inflow and outflow portions as a means for producing said zone of highest cooling effect at said tip element.

13. A blow pin assembly for extrusion blow molding apparatus having at least one blow pin, said blow pin comprising:
   (a) an inner tube through which inflation air is blown into a parison;
   (b) an outer sleeve positioned around the inner tubes; and
   (c) a tip element mounted in a position overlying an air outlet end of said inner tube, a blow port in said tip element communicating with an air outlet of said inner tube;
wherein inflow and outflow portions of a cooling fluid circulation path are defined between said inner tube and outer sleeve; wherein a cooling chamber, forming a a localized zone of highest cooling effect, is created within said tip element that communicates with an outlet of said inflow portion and an inlet of said outflow portion; and wherein the thickness of said tip element in areas peripherally surrounding said cooling chamber is substantially reduced relative to the thickness of the blow pin in areas peripherally surrounding said inflow and outflow portions as a means for producing said zone of highest cooling effect at said tip element.

14. A blow pin assembly according to claim 13, wherein said assembly comprises a second said blow pin, said blow pins being mounted together on a common support to form a dual blow pin unit.

15. A blow pin assembly according to claim 14, wherein said common support serves as a manifold for the delivery and return of cooling fluid circulated through said blow pins.

16. A blow pin assembly according to claim 15, wherein said common support also serves as a manifold for the delivery of inflation air to the inner tube of each blow pin.

17. A blow pin assembly according to claim 16, wherein plural blow pin units are provided, said plural blow pin units being carried on a common displacement means for producing reciprocaton thereof in unison.

18. A blow pin assembly according to claim 13, wherein a cylindrical clearance space is formed between said inner tube and said outer sleeve, a pair of rods being axial positioned and secured within the clearance space in a manner subdividing said clearance space into said inflow and outflow portions of said path.

19. A blow pin assembly according to claim 13, wherein said inner tube is comprised of a cylindrical tubing and a seal element, said seal element being provided with sealing means for sealingly engaging against said outer sleeve and said tip element, wherein said outlet of said inflow portion, said inlet of said outflow portion and said air outlet of said inner tube are all provided in said seal element, and wherein said seal element interconnects said tip element with said outer sleeve.

20. In an extrusion blow molding apparatus according to claim 12, wherein said inner tube is comprised of a cylindrical tubing and a seal element, said seal element being provided with sealing means for sealingly engaging against said outer sleeve and said tip element, wherein said outlet of said inflow portion, said inlet of said outflow portion and said air outlet of said inner tube are all provided in said seal element, and wherein said seal element interconnects said tip element with said outer sleeve.

* * * * *